US012728398B2

(12) United States Patent
Dürr et al.

(10) Patent No.: US 12,728,398 B2
(45) Date of Patent: Sep. 8, 2026

(54) MIXING SILO FOR BULK MATERIAL, PRODUCTION PLANT WITH A MIXING SILO OF THIS TYPE AND METHOD FOR OPERATING A MIXING SILO OF THIS TYPE

(71) Applicant: Coperion GmbH, Stuttgart (DE)

(72) Inventors: Michael Dürr, Wolfegg (DE); Egon Zechner, Ravensburg (DE)

(73) Assignee: COPERION GMBH, Stuttgart (DE)

(*) Notice: Subject to any disclaimer, the term of this patent is extended or adjusted under 35 U.S.C. 154(b) by 868 days.

(21) Appl. No.: 18/001,938

(22) PCT Filed: Jun. 10, 2021

(86) PCT No.: PCT/EP2021/065642
§ 371 (c)(1),
(2) Date: Dec. 15, 2022

(87) PCT Pub. No.: WO2021/254876
PCT Pub. Date: Dec. 23, 2021

(65) Prior Publication Data
US 2023/0234009 A1 Jul. 27, 2023

(30) Foreign Application Priority Data
Jun. 19, 2020 (DE) ......................... 102020207608.1

(51) Int. Cl.
*B01F 35/00* (2022.01)
*B01F 25/50* (2022.01)
(Continued)

(52) U.S. Cl.
CPC .............. *B01F 35/34* (2022.01); *B01F 25/50* (2022.01); *B01F 25/821* (2022.01); *B01F 2101/2805* (2022.01)

(58) Field of Classification Search
CPC ........ B01F 35/34; B01F 25/821; B01F 25/50; B01F 35/30; B01F 2101/2805
See application file for complete search history.

(56) References Cited

U.S. PATENT DOCUMENTS 4,518,260 A * 5/1985 Goins .................. B01F 25/821 366/137
4,632,565 A * 12/1986 Mahoney, Jr. ........ B01F 25/821 366/182.1
(Continued)

FOREIGN PATENT DOCUMENTS

CN 102238999 A 11/2011
DE 1034464 B 7/1958
(Continued)

OTHER PUBLICATIONS

International Preliminary Report on Patentability issued by the European Patent Application for International Patent Application PCT/EP2021/065642 dated Oct. 10, 2022 (German Language only) (20 pages).
(Continued)

*Primary Examiner* — Anshu Bhatia
(74) *Attorney, Agent, or Firm* — DINSMORE & SHOHL LLP

(57) ABSTRACT

A mixing silo for bulk material comprises a silo container, a mixing installation mounted in the silo container for mixing the bulk material, at least one shut-off element for shutting off the mixing installation, wherein the mixing silo has a minimum extraction rate and the silo container, with the mixing installation shut off, has a residual cross-sectional area which ensures a mass flow of the bulk material that is greater than or equal to the minimum extraction rate of the mixing silo.

20 Claims, 10 Drawing Sheets

(51) Int. Cl.

| | |
|---|---|
| ***B01F 25/82*** | (2022.01) |
| ***B01F 35/30*** | (2022.01) |
| *B01F 101/00* | (2022.01) |

(56) References Cited

U.S. PATENT DOCUMENTS

| | | | | |
|---|---|---|---|---|
| 4,978,227 | A | 12/1990 | Paul | |
| 2006/0082138 | A1 | 4/2006 | Kraenzle | |
| 2012/0230146 | A1 * | 9/2012 | Ungerechts | B01F 35/714 366/150.1 |
| 2020/0139315 | A1 * | 5/2020 | Takemoto | B01F 27/72 |

FOREIGN PATENT DOCUMENTS

| | | | |
|---|---|---|---|
| DE | 8810607 | U1 | 12/1989 |
| DE | 102014108270 | A1 | 12/2015 |
| JP | S49122460 | U | 10/1974 |
| JP | S6436028 | U | 3/1989 |

OTHER PUBLICATIONS

German Office Action for German Patent Application No. 102020207608.1 dated Feb. 8, 2021 (German Language only) (4 pages).

Office Action issued Jan. 29, 2026, in Chinese Patent Application No. 202180043660.6, filed Jun. 10, 2021 (with English-language translation).

* cited by examiner

MIXING SILO FOR BULK MATERIAL, PRODUCTION PLANT WITH A MIXING SILO OF THIS TYPE AND METHOD FOR OPERATING A MIXING SILO OF THIS TYPE

CROSS-REFERENCES TO RELATED APPLICATIONS

This application claims the priority of International Patent Application, Serial No. PCT/EP2021/065642, filed Jun. 10, 2021, and the priority of German Patent Application, Serial No. DE 10 2020 207 608.1, filed Jun. 19, 2020, the content of which are incorporated herein by reference in their entirety as if fully set forth herein.

FIELD OF THE INVENTION

The invention relates to a mixing silo for bulk material, a production plant with a mixing silo of this type and a method for operating a mixing silo of this type.

BACKGROUND OF THE INVENTION

DE 88 10 607 U1 discloses a mixing container having a central outlet opening and further outlet openings that enable mixing of the bulk material in the container. The flow speed of the bulk material is influenced by mixing installations in such a manner that a wide dwell time distribution of the bulk material is created in the container. This results in reliable mixing of the bulk material. Bulk material that is added to the container at different times can be discharged from the container at the outlet at the same time. The wide dwell time distribution leads to an increased dwell time of the bulk material. The increased dwell time can be multiple times, in particular up to 3 times or more, the dwell time of a bulk material flowing through the mixing container according to the "first in-first out" principle, the so-called plug flow. With the "first in-first out" principle, bulk material that was fed into the container first leaves the silo first. In the event of a product change, bulk material for a new product is conveyed to the container in which bulk material for a previous product is still present. New product can only be used when the bulk material for the previous product has been completely removed from the container. During this transition period, a so-called transition product accumulates, which comprises the bulk materials for the previous product and the new product. The transition product typically cannot be used for further processing and must be discarded as so-called B or C goods, for example.

DE 10 34 464 B discloses a device for mixing granular material with several discharge tubes brought together outside the mixing silo.

DE 10 2014 108 270 A1 discloses a silo for storing bulk material and a method for removing bulk material from a silo.

US 2006/0082138 A1 discloses a T-shaped flange connection.

U.S. Pat. No. 4,978,227, JP S64 36 028 U and JP S 49 122 460 U each disclose a mixer for bulk material.

SUMMARY OF THE INVENTION

It is an object of the present invention to improve a product changeover in a production plant for plastics and, in particular, to reduce the amount of bulk material to be discarded.

The object is achieved according to the invention by a mixing silo for bulk material comprising a. a silo container, b. a mixing installation mounted in the silo container for mixing the bulk material, c. at least one shut-off element for shutting off the mixing installation, wherein the mixing silo has a minimum extraction rate, wherein the silo container, with the mixing installation shut off, has a residual cross-sectional area which ensures a mass flow of the bulk material which is greater than or equal to the minimum extraction rate of the mixing silo.

The object is further achieved by a production plant having a. a production reactor for producing bulk material, b. a mixing silo according to the invention, c. a feed unit for feeding bulk material, in particular from the production reactor, into the mixing silo.

The object is further achieved by a method for operating a mixing silo according to the invention comprising the steps of feeding bulk material into the mixing silo, mixing of the bulk material in the mixing silo by means of the mixing installation, shutting off the mixing installation by means of the at least one shut-off element, discharging the bulk material from the mixing silo with the mixing installation shut off. 9.A production plant having a. a production reactor (2) for producing bulk material, b. a mixing silo (4; 4*a*; 4*b*; 4*c*; 4*d*; 4*e*; 4*f*) according to any one of the preceding claims, c. a feed unit (3) for feeding bulk material, in particular from the production reactor (2), into the mixing silo (4; 4*a*; 4*b*; 4*c*; 4*d*; 4*e*; 4*f*).

According to the invention, it has been recognized that the transition period of bulk material in a mixing silo and thus the amount of bulk material to be discarded is reduced if the mode of operation of the mixing silo can be alternated between a mixing function with a wide dwell time distribution and a flow-through function with a narrow dwell time distribution. At least one mixing installation mounted in a silo container is provided for the mixing function. A mixing installation in the sense of the invention is understood to mean a mixing installation which changes, in particular increases, the dwell time of the bulk material in the mixing silo. In particular, fixtures in the silo container which do not have a dwell time-generating effect on the bulk material are not mixing installations in the sense of the invention. Mixing installations which do not generate a dwell time are, for example, fastening elements, in particular retaining struts, retaining rods and/or plates, wherein the fastening elements serve in particular only to fasten the mixing installation in the silo container.

A plurality of mixing installations can also be provided in the silo container and fastened therein. In particular, the mixing installation is designed so as to be static, i.e. it does not have any movable elements such as agitators and/or paddles. At least one shut-off element is provided for the flow-through function, which serves to shut off the at least one mixing installation. In particular, a plurality of shut-off elements can also be provided for the at least one mixing installation. The at least one shut-off element is in particular arranged inside the silo container. The at least one shut-off element can also be arranged outside the silo container, in particular if the at least one mixing installation runs outside the silo container or is arranged outside the silo container, at least in some regions.

The silo container has an outlet, which is arranged in particular at a lower end of the silo container. The outlet is formed in particular by a discharge opening. The at least one mixing installation has an inlet and an outlet. The outlet of the mixing installation is arranged in particular upstream of the outlet of the silo container. The outlet of the at least one mixing installation opens in particular into the outlet of the silo container.

The volume proportion of the at least one mixing installation is small compared to the net volume of the silo container. In particular, the ratio is smaller than 0.1, in particular smaller than 0.05 and in particular smaller than 0.01.

The at least one shut-off element can be arranged at the inlet of the mixing installation, at the outlet of the mixing installation and/or in between. The arrangement of the at least one shut-off element at the outlet of the mixing installation is uncomplicated to realise. In particular, the outlet of the mixing installation is easily accessible from an underside of the silo container. The at least one shut-off element can be attached, retrofitted, repaired and/or maintained at the outlet of the mixing installation in an uncomplicated manner.

The arrangement of the at least one shut-off element at the inlet makes it possible to prevent additional bulk material from entering the mixing installation when the mixing installation is shut off. Existing bulk material can flow out of the mixing installation via the outlet, in particular arranged at the bottom, despite the mixing installation being shut off. This prevents the powder material from unintentionally remaining in the mixing installation, whereby the stagnating powder material could solidify in the mixing installation. The arrangement of the at least one shut-off element at the inlet of the mixing installation is particularly advantageous for mixing powder material, especially polypropylene (PP) powder and/or linear low-density polyethylene (LLDPE) powder.

The at least one shut-off element is displaceable between a closed position, in which a bulk material flow through the mixing installation is prevented, and an open position, in which a bulk material flow through the mixing installation is possible. In the open position of the at least one shut-off element, the mixing silo has the mixing function. In the closed position of the at least one shut-off element, the mixing silo has the flow-through function.

The flow-through function is ensured by the silo container having a residual cross-sectional area when the mixing installation is shut off, which ensures a mass flow of the bulk material that is greater than or equal to a minimum extraction rate of the mixing silo. The residual cross-sectional area is in particular limiting for the silo container. This means that the limiting residual cross-sectional area represents a minimum cross-sectional area of the silo container along the flow direction of the bulk material. In particular, the limiting residual cross-sectional area may be smaller than an outlet cross-sectional area at the outlet of the silo container. The outlet cross-sectional area of the silo container corresponds to the cross-sectional area of the silo container when the mixing installation is open. Due to the limiting residual cross-sectional area, in particular a maximum possible mass flow is determined when the mixing installation is shut off. According to the invention, it has been recognised that the flow-through function of the mixing silo is guaranteed when the mixing installation is shut off due to the sufficient size of the residual cross-sectional area. This means that even when the mixing function of the mixing silo is deactivated due to the mixing installation being shut off, the output, i.e. the mass flow through the mixing silo, is maintained. This ensures that the dwell time of the bulk material in the flow-through function is reduced. In the event of a product change, the transition period and thus the quantity of bulk material to be discarded is reduced.

In the flow-through function, the mixing silo works according to the "first in-first out" principle. In particular, the mixing silo is operated in mass flow.

The minimum extraction rate is a characteristic value for the mixing silo. The minimum extraction rate is also referred to as the throughput rate. The minimum extraction rate for a mixing silo is usually designed in such a manner that the process capacity, in particular the extruder capacity, is not limited by the mixing silo. To ensure this, the process capacity is multiplied by a safety factor of, for example, at least 1.1, in particular at least 1.3, in particular at least 1.5 or higher. The minimum extraction rate is in particular at least 20 t/h, in particular at least 40 t/h, in particular at least 60 t/h and in particular at least 80 t/h.

The average dwell time $t_{Vm}$ of the mixed material in the mixing silo can be calculated from the net volume $V_n$ of the silo container, the minimum extraction rate $\dot{Q}_{min}$ and the bulk material density $\eta$ of the bulk material density as follows:

$$T_{Vm}=V_n/(\dot{Q}_{min}\cdot\eta).$$

The average dwell time for a mixing silo according to the invention is between 0.3 h and 24 h, in particular between 0.4 h and 22 h and more particularly between 0.5 h and 20 h.

The minimum extraction rate can in particular be variably determined for the mixing silo. The mass flow of the bulk material in mass flow operation is in particular double, in particular at least 3 times, in particular at least 4 times, in particular at least 5 times, in particular at least 10 times and in particular at most 20 times the minimum extraction rate.

The limiting residual cross-sectional area of the silo container is in particular full-surface or hollow. The residual cross-sectional area has in particular a round outer contour. The residual cross-sectional area is in particular circular or annular. The outer contour of the cross-sectional area can also be designed so as to be non-circular, for example oval or polygonal. If an inner contour of the residual cross-sectional area is provided, this is in particular round, but can also be designed so as to be non-round, in particular oval or polygonal. Any combination of inner and outer contour is possible.

It has been found that the mass flow can be calculated by the limiting residual cross-sectional area.

For circular and non-circular openings, the so-called Beverloo equation applies:

$$\dot{M} = C\rho\sqrt{g}\,(D_0 - kd)^{5/2} \tag{1}$$

In equation (1) $\dot{M}$ is the mass flow in kg/s, $\eta$ is the bulk material density in kg/$m^3$, g is the acceleration due to gravity (9.81 m/$s^2$), $D_0$ is the diameter of a circular discharge opening or the hydraulic diameter of a non-circular opening in m, d the particle diameter of the bulk material in m, C an empirical discharge coefficient, which is in particular dependent on product friction and bulk material density and typically is between 0.55 and 0.65, in particular at 0.58, and k an empirical particle coefficient, which is in particular dependent on particle shape and cone opening angle at the mixing silo and is in a range between 1.0 and 2.0, in particular at 1.6.

Accordingly, a circular or non-circular residual cross-sectional area at a specified minimum extraction rate must $\dot{M}_{min}$ have a diameter or hydraulic diameter $D_0$ as follows $$D_0 \geq \left( \frac{\dot{M}_{min}}{\sqrt{g} \cdot C \cdot \rho} \right)^{2/5} + k - d \tag{2}$$

For slot-shaped openings, an equation modified by Nedderman can be used to calculate the mass flow:

$$\dot{M} = \frac{4\sqrt{2}\,C}{\prod} \rho \sqrt{g} (L - kd)(B - kd)^{3/2} \tag{3}$$

In this equation (3), the meanings for $\dot{M}$, η, g, d, C and k are identical to the Beverloo equation (1). L corresponds to the length of the slot outlet in m and B to the width of the slot outlet in m. For an annular opening, L corresponds to the circumference of the mean diameter of the annular gap and B to the width of the annular gap. Correspondingly, the length L and width B of the annular opening can be determined at least approximately for a given minimum extraction rate.

The equations of Beverloo (1) and Nedderman (3) are published in DOI: 10.1615/AtoZ.g. granular_materials_discharge_through_orifices by Nedderman, E. I.

The bulk material can exit the mixing silo in mass flow through the residual cross-sectional area. A plug flow is created in the mixing silo.

The mixing silo, which is also referred to as a homogenizing silo, is in particular a gravimetric mixer in a plant for plastics production and/or plastics processing, so-called compounding, for bulk materials consisting of powder and/or granules. The powder has a mean particle size between 50 μm and 2000 μm, in particular between 150 μm and 1800 μm and in particular between 300 μm and 1500 μm. The granules have a mean particle size of 1500 μm to 6000 μm, in particular of 1800 μm to 5000 μm and in particular of 2000 μm to 4000 μm.

The bulk materials are conveyed in the plant in particular by means of gravimetric and/or pneumatic conveying. Plastics are in particular polyolefins such as polyethylene (PE) and/or polypropylene (PP) as well as engineering plastics such as polyamide (PA), polycarbonate (PC), acrylonitrile-butadiene-styrene copolymer (ABS) and/or polyethylene terephthalate (PET). PVC dryblend, plastic regrind, plastic regranulate and recycled plastic products can also be used as plastics.

Filling the mixing silo, which is also referred to as feeding, is carried out in particular gravimetrically and/or by means of pneumatic conveying. Gravimetric conveying is understood to mean that the bulk material moves downwards as a result of gravity, in particular automatically. The emptying of the mixing silo, which is also referred to as discharge, is carried out in particular gravimetrically, in particular into containers, big bags, silo tankers and/or railcars. Alternatively, it is conceivable that a pneumatic conveyor system is connected to the mixing silo in order to convey the bulk material into downstream containers, in particular silos.

Mixing in the mixing silo takes place in particular gravimetrically, in that at least one portion of the bulk material flows through the at least one mixing installation. The portion of the bulk material flowing through the at least one mixing installation is in particular between 10% and 90% of the bulk material flowing through the mixing silo. In particular, the portion is between 15% and 85%, in particular between 20% and 80%, and in particular between 25% and 75%.

The at least one mixing installation ensures that bulk material from different heights of the mixing silo is drawn off simultaneously and mixed with each other, i.e. homogenized, in an outlet region of the mixing silo from the different heights in order to achieve a uniform quality of the bulk material. In particular, the mixing silo is operated continuously. Due to the at least one mixing installation, the bulk material is not withdrawn from the mixing silo in mass flow in the sense of a plug flow during mixing operation, but the bulk material can flow directly from the top to the bottom due to the formation of flow zones and/or through openings in mixing tubes. As a result, the bulk material from the different heights in the mixing silo arrives simultaneously at the bottom of the mixing silo and is thus mixed together. For example, bulk material that is filled last and is at the top of the mixing silo can be combined with bulk material that is filled first and is at the bottom of the mixing silo before it exits the mixing silo.

It can be provided that the bulk material flowing out of the mixing silo is fed back into the mixing silo once or several times. For this purpose, the bulk material can be fed back into the mixing silo from above after it has flowed out of the mixing silo by means of pneumatic conveying via a recirculation line. By means of a so-called recirculation or circulation, the mixing quality, i.e. the degree of homogenization of the bulk material, is additionally improved.

In plastics production and/or processing, bulk materials of different quality classes, also referred to as grades, are used. It is also possible to use different types of bulk materials, i.e. bulk materials with different chemical and/or physical properties. This is particularly the case in processing plants, so-called compounding plants, or recycling plants.

The dwell time distribution is defined as the time span within which particles that enter the silo at a given point in time have safely left the silo again through the outlet. In the mixing silo according to the invention, the dwell time distribution is very narrow in flow-through operation, i.e. in mass flow in the sense of a plug flow, when the at least one mixing installation is shut off. If several shut-off elements are provided, it may be sufficient if at least one shut-off element is in the shut-off state to ensure flow-through operation. In particular, all shut-off elements are in the shut-off state during flow-through operation.

Closing the at least one mixing installation ensures that the mixing silo is operated according to the “first in-first out” principle. Bulk material that is already present in the mixing silo is withdrawn from the mixing silo, in particular without being mixed with a transition product. This bulk material can be temporarily stored according to type and used for further applications. Separation of this mixed material can be dispensed with. The economic efficiency of the plant and the method is thus increased. In particular, the closing of the at least one shut-off element takes place before the change of one bulk material type and/or one bulk material quality class to another bulk material type and/or another bulk material quality class. This prevents the flow of the bulk material into and/or through the at least one mixing installation. The bulk material flows exclusively in the region where there are no mixing installations. In particular, the bulk material flows uniformly in a mass flow in the sense of a plug flow. The bulk material fed into the mixing silo for the next application is filled from above onto the bulk material already present in the mixing silo. The newly filled bulk material remains above the bulk material previously present in the mixing silo. Mixing of the bulk materials is prevented.

The applicant has further found that by shutting off the at least one mixing installation, the so-called bulk cone segregation is prevented when emptying the mixing silo. The bulk cone segregation occurs in particular when the bulk material is a recycled product which may have different particle shapes such as compact, fibrous or film chip-like, and/or different particle sizes in a range from 100 μm to 10 mm. Due to the fact that the bulk material flows through the mixing silo in a mass flow in the sense of a plug flow when the mixing installation is shut off, a segregation is prevented.

A mixing silo configured such that the silo container has a base container, which is in particular designed so as to be cylindrical, and a bottom section, which is in particular conical, is of uncomplicated design and favours gravimetric operation.

A mixing silo configured such that the at least one shut-off element is arranged at and/or in the mixing installation, ensures a spatially flexible shut-off of the mixing installation. In particular, it is conceivable to provide a plurality of shut-off elements on one and the same mixing installation, wherein the shut-off elements can be arranged at different positions, in particular along the longitudinal axis, i.e. at different height positions. The shut-off element is arranged in particular in an outlet region of the mixing silo. The size of the shut-off element can thus be designed to be small. Additionally or alternatively, it is conceivable to arrange the shut-off element in the inlet region of the mixing silo and/or between the inlet region and the outlet region of the mixing silo.

A mixing silo configured such that the mixing installation comprises at least one mixing tube and/or at least one mixing cone, has improved mixing properties.

The mixing silo can be designed as a so-called cone mixer or flow zone mixer, in which the bulk material from different heights reaches the outlet at the same time by forming flow zones, which are formed at different heights in the mixing silo. In particular, the cone mixer has at least one mixing cone.

Alternatively, the mixing silo can be designed as a so-called tube mixer having at least one mixing tube, in which the bulk material enters the mixing tube via at least one opening. The opening is also referred to as a siphon opening. In particular, a plurality of mixing tubes having one or more openings are provided, which are located at different heights in the mixing silo, wherein the bulk material simultaneously reaches the outlet through the openings. The openings can be arranged at an outer jacket wall of the mixing tube and/or on the front side of the mixing tube. The mixing tube is designed in particular as a cylindrical tube. However, the mixing tube can also have a non-circular contour, in particular an oval or polygonal contour.

A mixing silo configured such that the at least one mixing tube and/or the at least one mixing cone open into a collecting pot, wherein in particular the at least one shut-off element is arranged at and/or in the collecting pot, is particularly compact and, in particular, constructed as to be small.

A mixing silo comprising a shut-off drive connected to the at least one shut-off element for driven actuation of the at least one shut-off element, enables a simplified shut-off of the mixing installation. A shut-off drive can, for example, be designed to be pneumatic or electrical, to actuate the shut-off element in a driven manner.

It is advantageous to create a mechanical connection between the shut-off element and the shutoff drive so that the shut-off drive is arranged in particular outside the mixing silo and is thus accessible from outside the mixing silo. Maintenance and/or repair work on the shut-off drive is simplified. Impairment of the drive due to direct contact with the bulk material is avoided. The service life of the shut-off drive is increased.

It is advantageous to provide an automated position indicator for the shut-off element and/or for the shut-off drive. The position indicator is designed in particular as a limit switch. The position indicator shows whether the shut-off element is in the open position or in the closed position. It is conceivable that only one limit switch for one of the two positions or two limit switches for both positions are provided. It is advantageous if at least one limit switch is provided for the open position. This ensures that the normal operation of the mixing silo, i.e. the mixing operation, is immediately recognizable.

Alternatively, it is possible to adjust the at least one shut-off element manually. This reduces the amount of equipment required for the mixing silo.

A mixing silo comprising a control unit in signal connection with the shut-off drive for automated actuation of the at least one shut-off element, enables an automated operation of the mixing silo, in particular an automated switching from mixing operation to flow-through operation and vice versa. In particular, a fully automated and/or controlled operation of the mixing silo is possible.

An embodiment of the at least one shut-off element as a flap disc is particularly uncomplicated and reliable in use. In particular, the flap disc has at least one uneven side surface. This reduces and in particular prevents the risk of a product deposit. The uneven design of the side surface can be achieved, for example, by a flattening with an angle of inclination between 10° and 70°, in particular between 15° and 45° and in particular between 20° and 30°. The side surface can additionally or alternatively be configured to be rounded, in particular with a circular or elliptical contour.

Alternatively, the shut-off element can be designed as a shut-off flap, shut-off slide, ball valve, iris diaphragm, as a conical shut-off element which is in particular axially adjustable, pinch valve or as a shiftable plate which is adapted to the mixing silo, similar to a shut-off slide. In the case of the flap disc or the shiftable plate, their size and shape are adapted to the contour which is to be closed, i.e. the contour of the cross-sectional area of the outlet of the mixing silo. It is advantageous if the shut-off element has as few as possible, in particular no, interfering edges which could impair the bulk material flow in the open position of the shut-off element and/or regions are created in which the bulk material could be accumulated. The at least one shut-off element can also be designed to be sealed, in particular with a sealing sleeve at the mixing installation.

It is advantageous for the flap disc and/or the shiftable plate if a remaining gap in the closed position between the shut-off element and the cross-sectional area of the mixing installation is in the range of 0.3 times to 20 times, in particular in the range of 0.4 times to 10 times and in particular in the range of 0.5 times to 5 times the average grain size of the bulk material to be conveyed.

A production plant having a. a production reactor for producing bulk material, b. a mixing silo according to the invention, c. a feed unit for feeding bulk material, in particular from the production reactor, into the mixing silo has substantially the advantages of the mixing silo, to which reference is hereby made. Bulk material is produced in a production reactor and fed into the mixing silo by means of a feed unit. The feeding can be carried out by means of pneumatic conveying and/or gravimetrically. It is also conceivable that a discharge unit is provided to discharge bulk material from the mixing silo. If the discharge is carried out purely gravimetrically, the discharge unit is formed in particular by a lower outlet opening.

A production plant comprising a recirculation unit connecting the discharge unit to the feed unit for recirculation of the bulk material, enables an improved homogenization of the bulk material.

A method for operating a mixing silo according to the invention comprising the steps of feeding bulk material into the mixing silo, mixing of the bulk material in the mixing silo by means of the mixing installation, shutting off the mixing installation by means of the at least one shut-off element, discharging the bulk material from the mixing silo with the mixing installation, has substantially the advantages of the mixing silo, to which reference is hereby made. By shutting off the at least one mixing installation, a bulk material flow through the mixing installation is reliably prevented. When the mixing installation is shut off, the bulk material is conveyed out of the mixing silo, in particular in a mass flow in the sense of a plug flow.

In a method, wherein the shut-off takes place when a change of a bulk material type and/or a bulk material quality class is pending, in particular at the beginning of the change, the bulk material quantity of a transition period can be additionally reduced. The transition period is the time period during a product change, i.e. a bulk material change, for example a bulk material type and/or a bulk material class, which is required to completely discharge the bulk material of the previous use from the mixing silo. The fact that the mixing installation is shut off when a product change is due, in particular at the beginning of the product change, prevents undesired mixing of the different bulk materials.

A method, wherein a plurality of, in particular all, shut-off elements are used for shutting off the mixing installation, has an increased mass flow.

A method, wherein the at least one shut-off element is opened again after a variably adjustable changeover time has elapsed, enables an easier changeover back from flow-through operation to mixed operation. In particular, the at least one shut-off element is reopened after a variably adjustable changeover time. The changeover time corresponds to the transition period. The transition period can in particular be calculated.

A method, wherein the maximum dwell time of the bulk material in the mixing silo with the mixing installation shut off is 1.0 times to 1.4 times a maximum dwell time of an otherwise identical silo container without mixing installation, enables a reduced maximum dwell time of the bulk material in the mixing silo. The maximum dwell time is the upper limit of the dwell time distribution. In particular, the dwell time is not or not significantly increased by the shut-off mixing installation compared to an otherwise identical silo container without mixing installation, wherein the silo container is operated according to the "first-in-first-out" principle. An otherwise identical silo container without mixing installation is understood to mean in particular a silo container which has the same usable volume of the silo container according to the invention, but is designed without mixing installation. In particular, the usable volume of the otherwise identical silo container is reduced by the volume proportion compared to the net volume of the silo container according to the invention that the mixing installation itself displaces in the silo container according to the invention. The maximum dwell time is in particular 1.0 times to 1.4 times the maximum dwell time of the otherwise identical silo container, in particular 1.0 times to 1.2 times and in particular 1.0 times to 1.1 times. The otherwise identical silo container has in particular an identical minimum extraction rate and an identical silo bulk material quantity.

Both the features indicated in the patent claims and the features indicated in the following embodiments of the mixing silo according to the invention are each suitable, either on their own or in combination with one another, for further forming the object according to the invention. The respective combinations of features do not represent any restriction with regard to the further embodiments of the subject-matter of the invention, but are essentially merely exemplary in character.

Further features, advantages and details of the invention will be apparent from the following description of embodiments based on the drawing.

DESCRIPTION OF THE PREFERRED EMBODIMENTS

Figure 1:
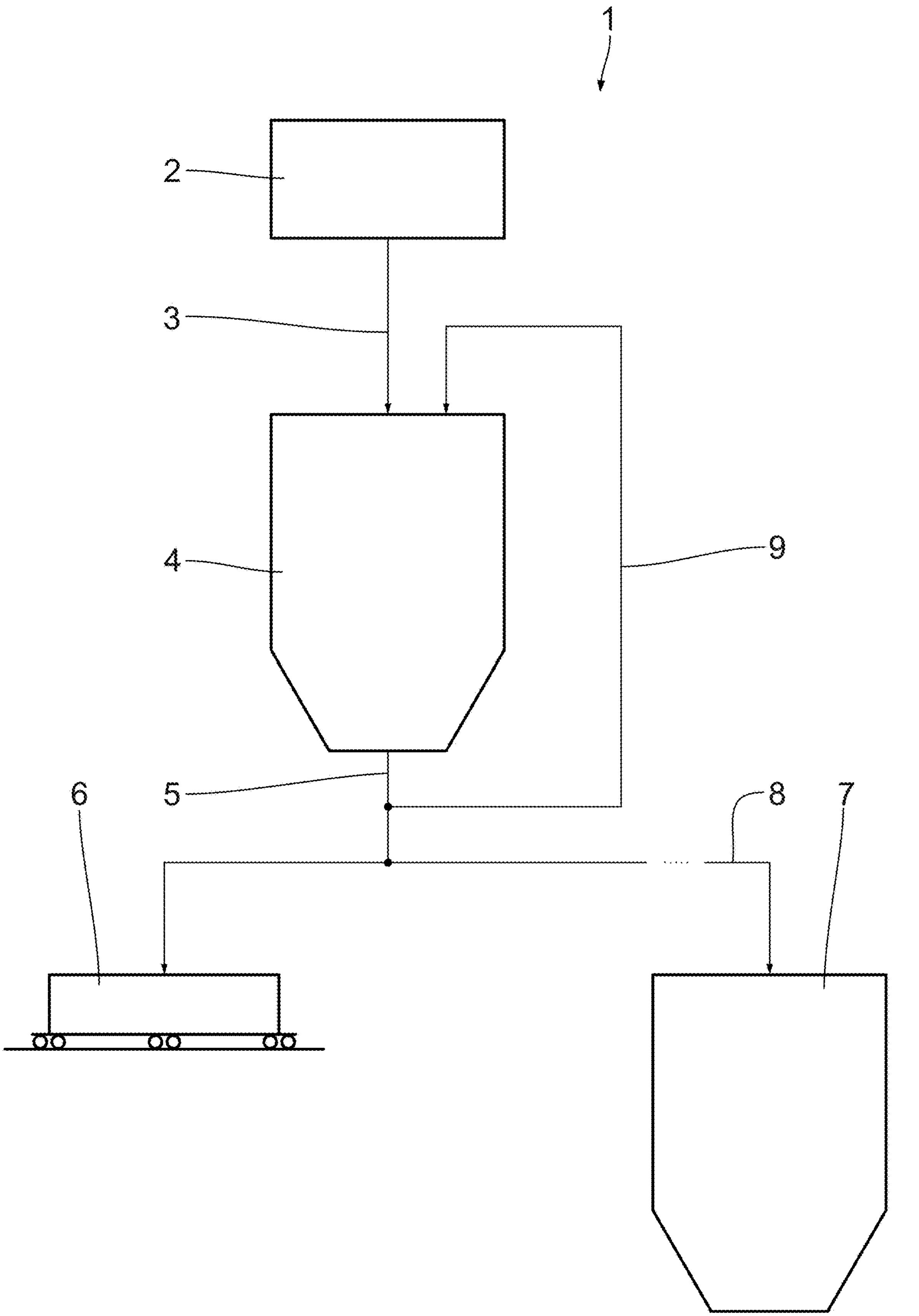
FIG. 1 shows a schematic illustration of a production plant for bulk material with a production reactor and a mixing silo according to the invention.

A production plant shown in FIG. 1, designated as a whole as 1, is used for the production of bulk material, in particular plastic granulate, in particular polyolefin granulate. The production plant 1 comprises a production reactor 2 in which bulk material is produced. The production reactor 2 is in particular a polymerization reactor and/or an extruder. The production reactor 2 is connected to a mixing silo 4 by means of a feed unit 3. The feed unit 3 serves to feed the bulk material into the mixing silo 4. The feeding can in particular be carried out purely gravimetrically. Pneumatic conveying can be used additionally or alternatively. In this case, the feed unit 3 is designed as part of a pneumatic conveying system.

In the mixing silo 4, the bulk material is mixed in a mixing operation and discharged for further use. The bulk material is discharged from the mixing silo 4 by means of a discharge unit. The discharge can be carried out in particular purely gravimetrically, for example by discharging the bulk material into a transport container 6. In this case, the discharge unit 5 is formed as an outlet opening of the mixing silo 4. In addition or alternatively, discharge can take place by means of pneumatic conveyance into a storage container 7, in particular a silo. In this case, the discharge unit 5 is formed as part of a pneumatic conveying system 8 from the mixing silo 4 into the storage container 7. A recirculation unit 9 in the form of a recirculation line is arranged in the region of the discharge unit 5. The recirculation unit 9 makes it possible to recirculate bulk material that has been discharged from the mixing silo 4 back into the mixing silo 4 in the region of the feed unit 3. For this purpose, the recirculation line, as shown in FIG. 1, can open separately from the feed unit 3 into an upper opening of the mixing silo 4. It is also possible that the recirculation line is connected to a feed line of the feed unit 3.

In the following, the mixing silo 4 in FIG. 1 is explained in more detail with reference to FIG. 2. The mixing silo 4 has a silo container 11 with a longitudinal axis 10. The silo container 11 comprises a cylindrical base container 12 and a conical bottom section 13 which is connected to the base container 12 at the lower end thereof. The silo container 11 has an upper inlet opening 14, in particular arranged centrically with respect to the longitudinal axis 10, and a lower outlet opening 15. The cross-sectional area of the outlet opening 15 corresponds to the cross-sectional area of the lower end of the conical bottom section 13. The outlet opening 15 is arranged at the lower end of the bottom section 13. The outlet opening 15 is arranged in particular concentrically to the longitudinal axis 10.

A plurality of mixing installations are arranged in the silo container 11, in particular permanently installed in the silo container 11. A first mixing installation is a central mixing tube 16 arranged concentrically to the longitudinal axis 10. The lower end of the mixing tube 16 forms the mixing tube outlet region 17, at which a mixing tube shut-off element 18 is arranged.

A further mixing installation is formed by a mixing cone 19, which in particular has a plurality of flow zones with different flow speeds. The mixing cone 19 tapers along the longitudinal axis 10 towards the discharge opening 15. The mixing cone 19 can have a plurality of sectors in the circumferential direction with respect to the longitudinal axis 10, which sectors are separated from each other by separating plates. The separating plates are oriented in particular vertically and radially with respect to the longitudinal axis 10. The mixing silo 4 according to FIG. 2 is also called a cone mixer.

The mixing cone 19 has a cone outlet region 20 at its lower end, on which a mixing cone shut-off element 21 is arranged.

Along the longitudinal axis 10, the mixing installations 16, 19, i.e. the mixing tube 16 and the mixing cone 19, are arranged overlapping at least in some regions. This means that the mixing cone 19 is arranged around the centrally arranged mixing tube 16.

Figure 2:
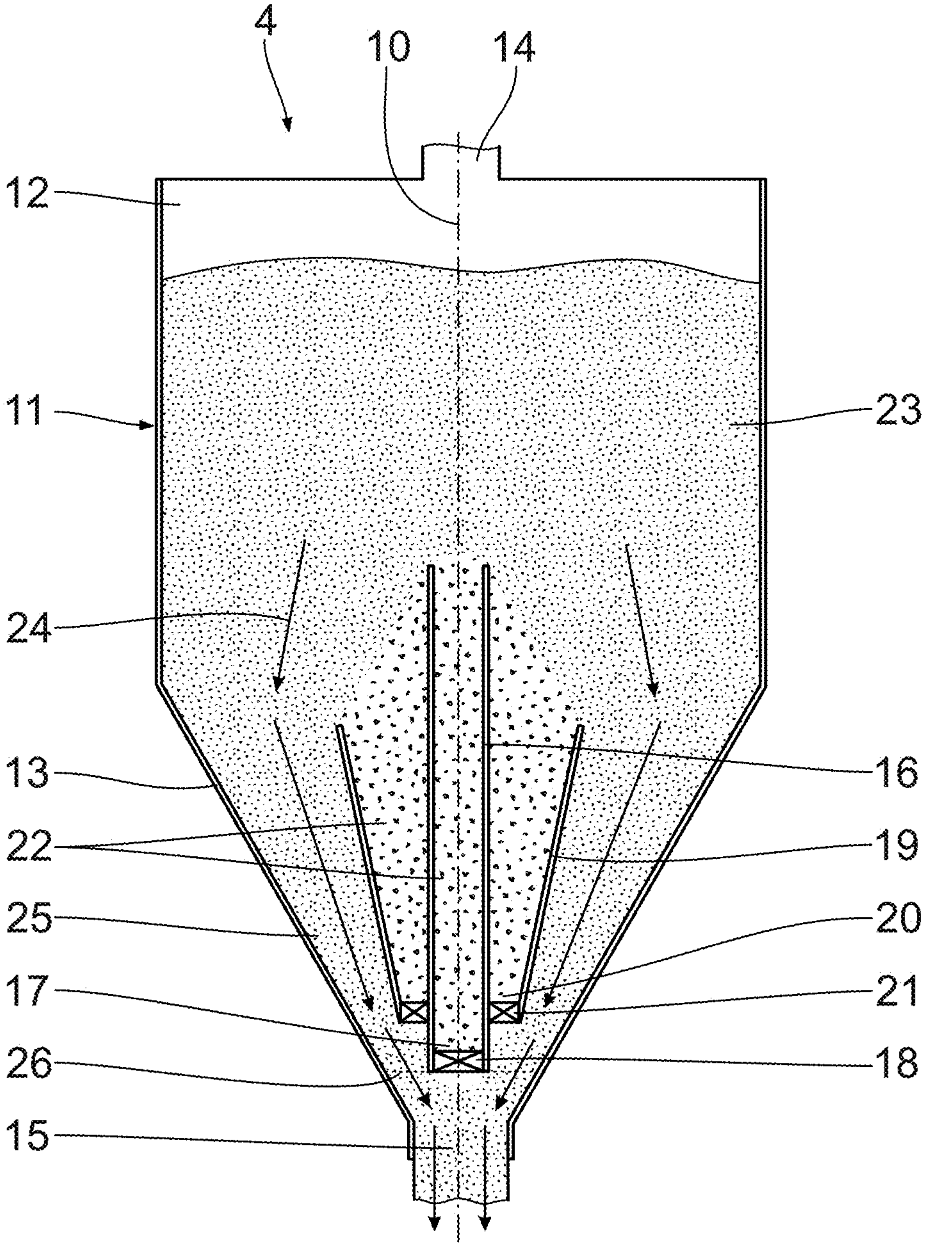
FIG. 2 shows a schematic longitudinal sectional illustration through the mixing silo according to FIG. 1, which is designed as a cone mixer.

The shut-off elements 18, 21 can be moved between a closed position shown in FIG. 2 and an open position. In the closed position shown, the mixing installations 16, 19 are closed. A bulk material flow through the mixing installations 16, 19 is prevented.

In the open position, a bulk material flow through the mixing internals 16, 19 is possible.

In particular, the shut-off elements 18, 21 can be actuated independently of each other.

In axial direction with respect to the longitudinal axis 10, the mixing tube 16 protrudes with the outlet region 17 downwards at the mixing cone 19. The outlet region 17 of the mixing tube 16 is arranged closer to the outlet opening 15 than the outlet region 20 of the mixing cone 19.

In the following, a method for operating the mixing silo 4 during a product change in the production plant 1 is explained in more detail with reference to FIGS. 1 and 2.

In the event of a product change, in particular a change of the bulk material type and/or the bulk material quality class, the production reactor 2 is converted to the new bulk material type and/or the new bulk material quality class. This changeover typically takes at least one hour, in particular several hours. In the production of plastic granulate, in particular polyolefin granulate, the mixing silo is operated continuously. In standard operation, the mixing silo 4 is in a mixing operation in which bulk material in the mixing silo 4 can enter the mixing installations 16, 19 and a wide dwell time distribution is achieved due to the different flow speeds. The shut-off elements 18, 21 are moved into the closed position and thus the mixing installations 16, 19 are closed. In the region of the closed mixing installations 16, 19, an accumulation region 22 is formed in which the bulk material stands, i.e. does not flow. Outside the accumulation region 22, a flow region 23 is formed in which the bulk material flows gravimetrically through the mixing silo 4 in mass flow, i.e. according to the “first-in-first-out” principle. The flow direction 24 of the flowing bulk material is symbolically marked in FIG. 2. The bulk material flows downwards in an outer edge region 25 around the centrally arranged mixing installations 16, 19. In the radial direction with respect to the longitudinal axis 10, the edge region 25 is bounded on its outside by the bottom section 13 and on its inside by the mixing cone 19.

The mixing silo 4 has a minimum residual cross-sectional area 26 which, according to the embodiment example shown, is designed to be annular. The residual cross-sectional area 26 is oriented in a plane perpendicular to the longitudinal axis 10. The residual cross-sectional area 26 represents the edge region 25 at an axial position of the shut-off element 18, which is arranged closest to the discharge opening 15.

The residual cross-sectional area 26 is large enough to ensure a mass flow of the bulk material that is greater than or equal to the minimum extraction rate of the mixing silo 4. This ensures that the mass flow in flow-through operation through the mixing silo 4 does not cause any limitation of the process performance of the production plant 1.

A subsequent opening of the shut-off elements 18, 21 takes place after a calculated transition period of the mixing silo 4 has elapsed.

The transition period in the mixing silo 4 is also referred to as the dwell time. The dwell time is the time required until the product change is completed in the mixing silo 4 itself, i.e. there is no longer any product in the mixing silo 4 that was in the mixing silo 4 before the change, but only product that is to be available after the change.

In particular, the shut-off elements 18, 21 are closed before the product change begins. The bulk material flows exclusively along the flow region 23, i.e. where there are no mixing installations 16, 19. The bulk material flows uniformly in a mass flow in the sense of a plug flow. The product to be added, which enters the mixing silo 4 via the feed opening 14, sinks downwards at a uniform speed in the mixing silo 4 over the cross-sectional area, i.e. without creating a dwell time distribution. Mixing of new product with old product is prevented. The opening of the shut-off elements takes place after the dwell time of the bulk product in the mixing silo 4 has elapsed. After the dwell time has elapsed, it can be assumed that no more product of the product previously in the mixing silo 4 is present. In particular, the time required for a product change can be made very short and, in particular, almost without transition.

Product that is in the mixing installations 16, 19 when the mixing installations 16, 19 are shut off can be emptied from the mixing silo 4 by opening the shut-off elements 18, 21 with the last transition product.

In the following, a further embodiment of the invention is described with reference to FIGS. 3 to 7. Constructively identical parts are given the same reference numerals as in the previous embodiment, the description of which is hereby referred to. Constructively different but functionally similar parts are given the same reference numerals with a trailing letter a.

In the mixing silo **4*a*, which is also designed as a cone mixer, a cylindrical extension section 27 is formed on the bottom section 13*a* at its lower end. The extension section 27 forms a mixing silo outlet region. An end cone 34 is flanged to the lower end of the mixing silo outlet region 27**.

In the mixing silo outlet region 27, a cylindrical extension 28 is arranged below and connected to the mixing installations 16, 19. The cylindrical extension 28 is designed to be tubular. The extension 28 is also referred to as a discharge pot or a collecting pot. A cone end piece 35 is attached to the collecting pot 28. The outlet regions 17 and 20 of the mixing installations 16 and 19 open into the cylindrical extension 28, which has an extension outlet 29 at its lower end opposite the mixing installations 16, 19. The extension outlet 29 forms a common outlet region for the mixing installations 16, 19 according to the embodiment example shown.

A shut-off element 30, in particular one single shut-off element, is arranged in the extension 28. The shut-off element 30 is designed as a flap disc, which is shown in the open position in FIG. 3. The shut-off element 30 is arranged axially with respect to the longitudinal axis 10 at a distance from the outlet region 17 of the mixing tube 16, so that a collision-free rotation of the flap disc is possible. The flap disc 30 is attached to a flap disc shaft 31. The flap disc shaft 31 runs perpendicular to the longitudinal axis 10 and is guided laterally out of the mixing silo **4*a*. Corresponding bearings 32 are provided for this purpose on the extension 28 and on the mixing silo outlet region 27**.

The end of the flap disc shaft 31 facing away from the flap disc 30 is connected to a shut-off drive 33. The shut-off drive 33 is in particular an electric motor. By means of the shut-off drive 33, the flap disc shaft 31 and thus the flap disc 30 can be rotated. A shift from the open position shown in FIG. 3 to the closed position is carried out by a 90° rotation around the flap disc shaft 31.

Figure 3:
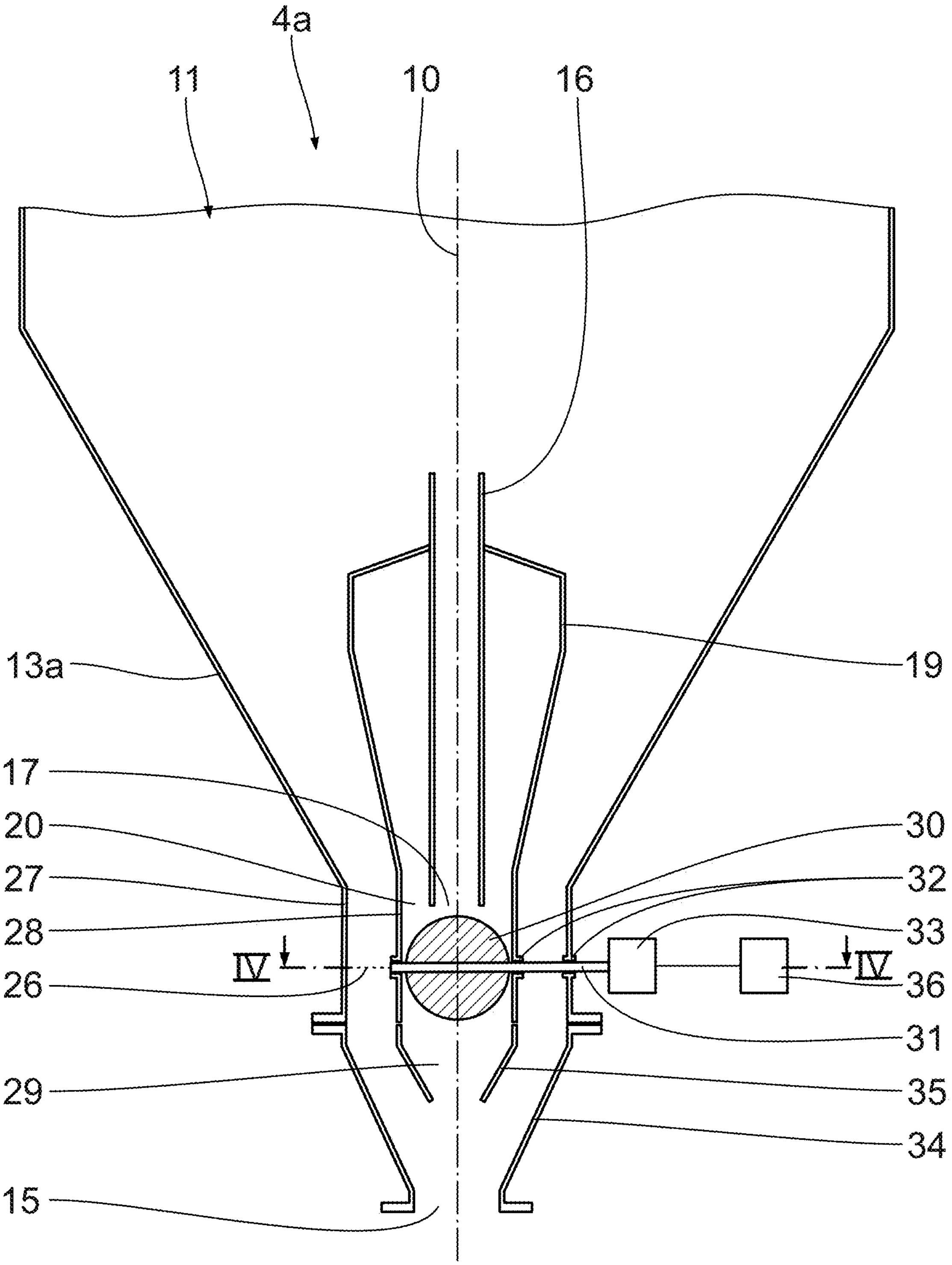
FIG. 3 shows an illustration corresponding to FIG. 2 of a mixing silo according to a further embodiment with a flap disc as a shut-off element, which is arranged in the outlet region of the mixing installation.

The shut-off drive is in signal connection with a control unit 36. The signal connection can be wired, as indicated in FIG. 3. The signal connection between the shut-off drive 33 and the control unit 36 can also be wireless.

Figure 4:
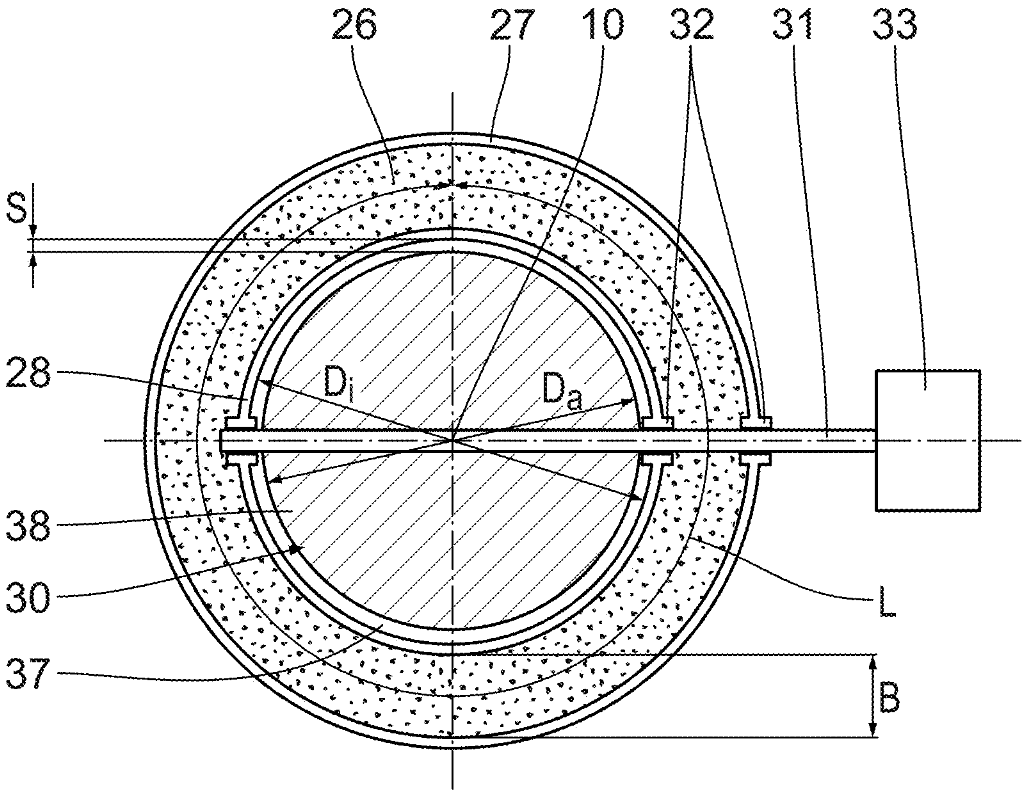
FIG. 4 shows an enlarged cross-sectional illustration of the mixing silo according to section line IV-IV in FIG. 3, FIGS. 5 to 7 show different configurations of a side edge of the flap disc in FIG. 4.

The design of the flap disc 30 is explained in more detail below with reference to FIG. 4. FIG. 4 shows the flap disc 30 in the closed position.

The flap disc 30 is adapted to the extension 28. In particular, the outer diameter $D_a$ of the flap disc 30 is adapted to the extension 28. In particular, the flap disc 30 is adapted to the extension 28 in such a manner that an annular gap 37 with a gap width S results between the outer diameter $D_a$ of the flap disc 30 and the inner diameter $D_i$ of the extension 28. It is advantageous if the annular gap 37 has a gap width S which is 0.3 to 20 times, in particular 0.4 to 10 times and in particular 0.5 to 5 times the average grain size of the bulk material.

Figure 5:
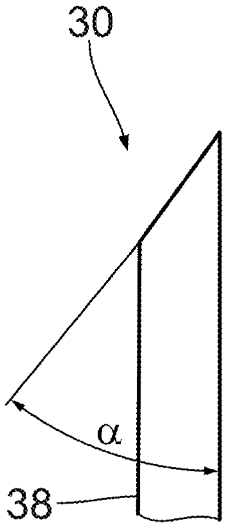

The flap disc 30 is essentially designed as a cylindrical disc with an upper side surface 38 which, in the closed position according to FIG. 4, faces the outlet regions 17, 20 of the mixing installations 16, 19. It is advantageous if the upper side surface 38 has a flattening with an angle $\alpha$ in an outer edge region. The flattening may extend along the entire circumference of the flap disc 30 or at least in regions along the circumference of the flap disc 30. A plurality of regions of a flattening separated from each other may be provided along the circumference. The angle $\alpha$ is in particular between 10° and 70°, in particular between 15° and 45° and in particular between 20° and 30°. A corresponding design of the flap disc is shown in FIG. 5.

Figure 6:
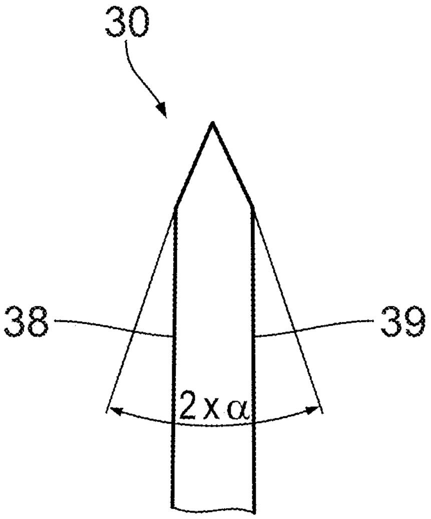

Alternatively, it is conceivable that a lower side surface 39 opposite the upper side surface 38 also has a corresponding flattening. The flattenings on the upper side surface 38 and the lower side surface 39 can also be designed with different angles. A flap disc 30 flattened on both sides is shown in FIG. 6.

Figure 7:
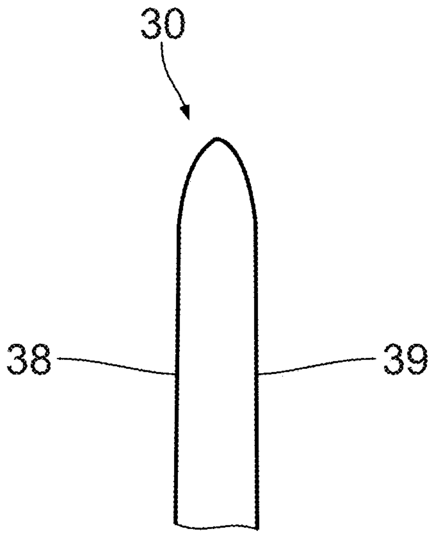

FIG. 7 shows a flap disc 30 in which the side surfaces 38, 39 are rounded in the outer edge region. The rounding can be elliptical, as shown in FIG. 7. Alternatively, a circular or differently shaped rounding is also possible.

The annular residual cross-sectional area 26 is dimensioned in such a manner that the bulk material can flow in mass flow through the mixing silo **4*a* of the shut-off mixing installations 16, 19. In particular, the residual cross-sectional area 26 is so large that a mass flow of the bulk material is ensured which is greater than or equal to the minimum extraction rate of the mixing silo 4*a***, in particular at least double, in particular at least 3 times, in particular at least 5 times, in particular at least 10 times and in particular at most 20 times the minimum extraction rate.

The operation of the mixing silo **4*a* is explained in more detail below. Initially, the mixing silo 4*a* operates in a standard mode, i.e. in a mixing mode. When a product change begins, product leaves the extruder that does not (yet) have the product characteristic that is to be set. In the mixing silo 4*a*, the mixing installations 16, 19 are shut off by means of the flap disc 30 by shifting the flap disc 30 from the open position shown in FIG. 3 to the closed position shown in FIG. 4. The mixing silo 4*a* operates in mass flow according to the "first in-first out" principle. The product still being discharged from the mixing silo 4*a* is so-called "old" product and can be fed to a corresponding storage container. The transition product produced as a result of the product change can be discharged from the mixing silo 4*a* into a separate storage container. Once the product change has been completed and all transition product has been discharged from the mixing silo 4*a*, the mixing silo 4*a* is returned from mass flow mode to mixing mode by shifting the flap disc 30 to the open position. First, a mixed product is discharged from the mixing silo 4***a*, which is a mixture of "new" product and the "old" product stored in the mixing installations 16, 19. This mixed product can also be discharged into the separate container for the transition product. It is also conceivable to provide an additional storage container for this mixed product.

When the mixed product has been completely discharged from the mixing silo 4*a*, there is only "new" product in the mixing silo 4*a*.

The "new" product is mixed in the mixing silo 4*a* and can be discharged into a storage container provided for this purpose.

Due to the fact that the shut-off drive 33 is connected to the control unit 36, the sequence, i.e. the change between the mixing operation and the flow-through operation, of the mixing silo 4*a* can be controlled and in particular regulated. In particular, the control unit 36 is in signal connection with the production reactor 2, in particular with an extruder, wherein a control signal is transmitted from the extruder to the control unit whenever the production of the "old" product and/or the transition product is completed.

Figure 8:
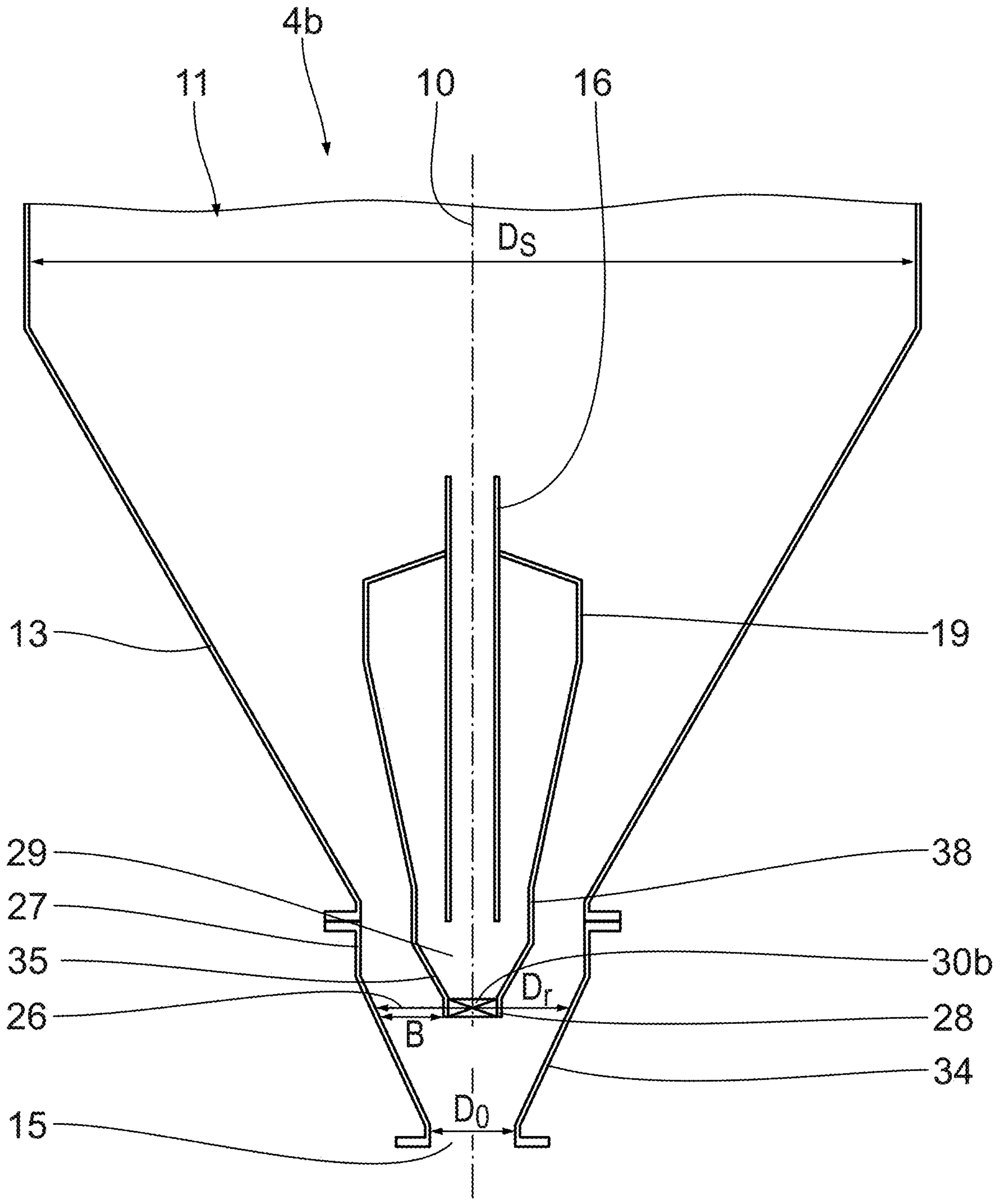
FIG. 8 shows an illustration corresponding to FIG. 3 of a mixing silo according to a further embodiment in which the shut-off element is arranged at the lower end of the outlet pot.

A further embodiment of the invention is described below with reference to FIG. 8. Constructively identical parts are given the same reference numerals as in the previous embodiments, the description of which is hereby referred to. Constructively different but functionally similar parts are given the same reference numerals with a trailing letter b.

The mixing silo 4*b* corresponds essentially to the previous embodiment in FIG. 3. One difference is that the shut-off element 30*b* is arranged at the lower end of the extension 28 with the cone end piece 35. The shut-off element 30*b* is shown purely schematically. The shut-off element 30*b* can be designed as a flap disc.

The mixing silo 4*b* has an outlet diameter $D_0$ at the outlet opening 15. The annular residual cross-sectional area 26 has an annular gap width B which corresponds to the difference between the inner diameter $D_r$ of the mixing silo outlet region 27 in the plane of the residual cross-sectional area 26 and the outer diameter of the extension 28 with cone end piece 35 in this region. The average annular gap length L is understood to be the average circumference of the annular residual cross-sectional area 26.

The base container 12 has an internal diameter $D_S$ of 4.2 m. The mixing silo 4*b* has a net volume of 130 $m^3$. The minimum extraction rate for the mixing silo 4*b* is set at 80 t/h of polyolefin pellets. The polyolefin pellets have a bulk material density of 550 $kg/m^3$ and a particle diameter of 3.5 mm. Accordingly, an empirical discharge coefficient C=0.58 and the empirical particle coefficient k=1.6 result.

The other geometric data of the mixing silo 4*b* are:

$$r=0.545\text{ m},\ D_0=0.31\text{ m},\ W=0.0454\text{ m and } L=1.566\text{ m}.$$

According to the Beverloo equation (1), the maximum mass flow through the outlet diameter $D_0$ of the mixing silo 4*b* is 184 t/h, which mass flow is greater than the minimum extraction rate, so that there is no limitation for the mixing silo 4*b* when the mixing installations 16, 19 are open.

If the mixing installations 16, 19 are shut off by the shut-off element 30*b* and the bulk material flows exclusively over the residual cross-sectional area, this results in a mass flow over the residual cross-sectional area 26 according to Nedderman's equation of 80.3 t/h.

The mixing silo 4*b* with the geometric data mentioned allows a mass flow over the residual cross-sectional area 26 that is greater than the minimum extraction rate.

Figure 9:
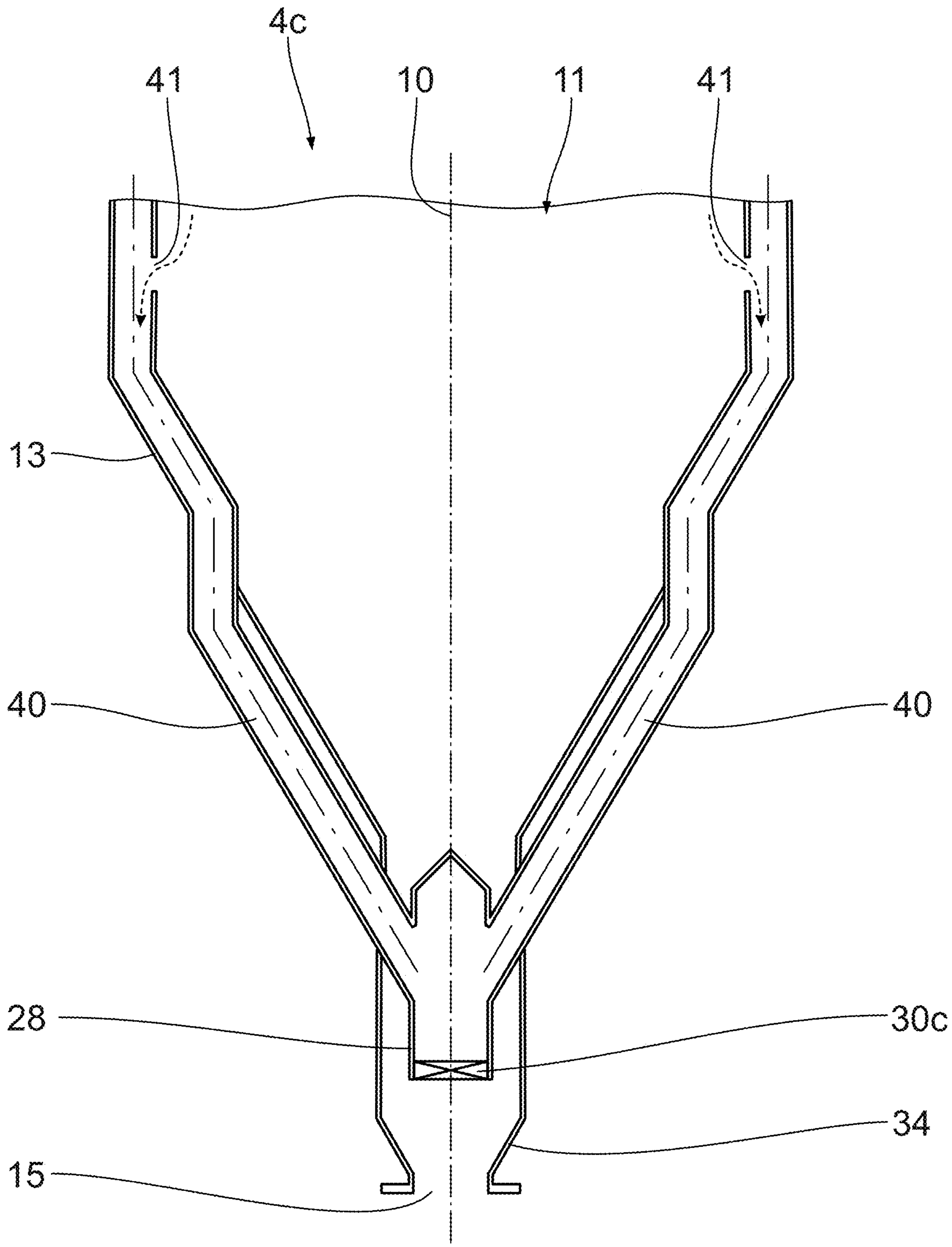
FIG. 9 shows an illustration corresponding to FIG. 3 of a mixing silo in the form of a tube mixer with a shut-off element in the outlet region of a collecting pot.

In the following, a further embodiment of the invention is described with reference to FIG. 9. Constructively identical parts are given the same reference numerals as in the previous embodiments, the description of which is hereby referred to. Constructively different but functionally similar parts are given the same reference numerals with a trailing letter c.

The mixing silo 4*c* is designed as a so-called tube mixer. According to the embodiment example shown, the tube mixer has two mixing tubes 40, each of which represents a mixing installation. The mixing tubes 40 are arranged in particular on the inner wall of the silo container 11 and are in particular fastened thereto. The mixing tubes 40 are arranged diametrically opposite with respect to the longitudinal axis 10. Fewer or more than two mixing tubes 40 may also be provided. The arrangement of the mixing tubes 40 relative to one another, in particular a spacing of the mixing tubes 40 in the circumferential direction about the longitudinal axis 10, can be selected differently.

The mixing tubes 40 open into the collecting pot 28. The shut-off element 30*c* is arranged at the lower end of the collecting pot, which can be designed in particular as an adapted flap disc. According to the embodiment example shown, the collecting pot 28 is configured to be cylindrical. It is conceivable to taper the outlet of the collecting pot 28 conically, in particular in order to be able to design the shut-off element 30*c* with a small construction.

The mixing tubes 40 each have at least one lateral opening 41 facing the interior space of the silo container 11. Bulk material can pass through the openings 41 from the silo container 11, in particular the base container 12, into a mixing tube 40. According to the embodiment example shown, the openings 41 in the mixing tubes 40 are each arranged at the same height, i.e. at the same axial position with respect to the longitudinal axis 10. It is conceivable that the openings 41 are arranged at different axial positions with respect to the longitudinal axis 10. In particular, it is conceivable that a plurality of openings 41 are provided on a mixing tube 40. A plurality of openings 41 on a mixing tube 40 can be arranged differently at the mixing tube 40 with respect to the axial position of the longitudinal axis 10. It is also conceivable that a plurality of openings 41 are arranged at the mixing tube 40 at the same height with respect to the longitudinal axis 10, but at different circumferential positions of the mixing tube 40.

The mixing tubes 40 each have a circular cross-section. Other cross-sectional shapes are possible.

Figure 10:
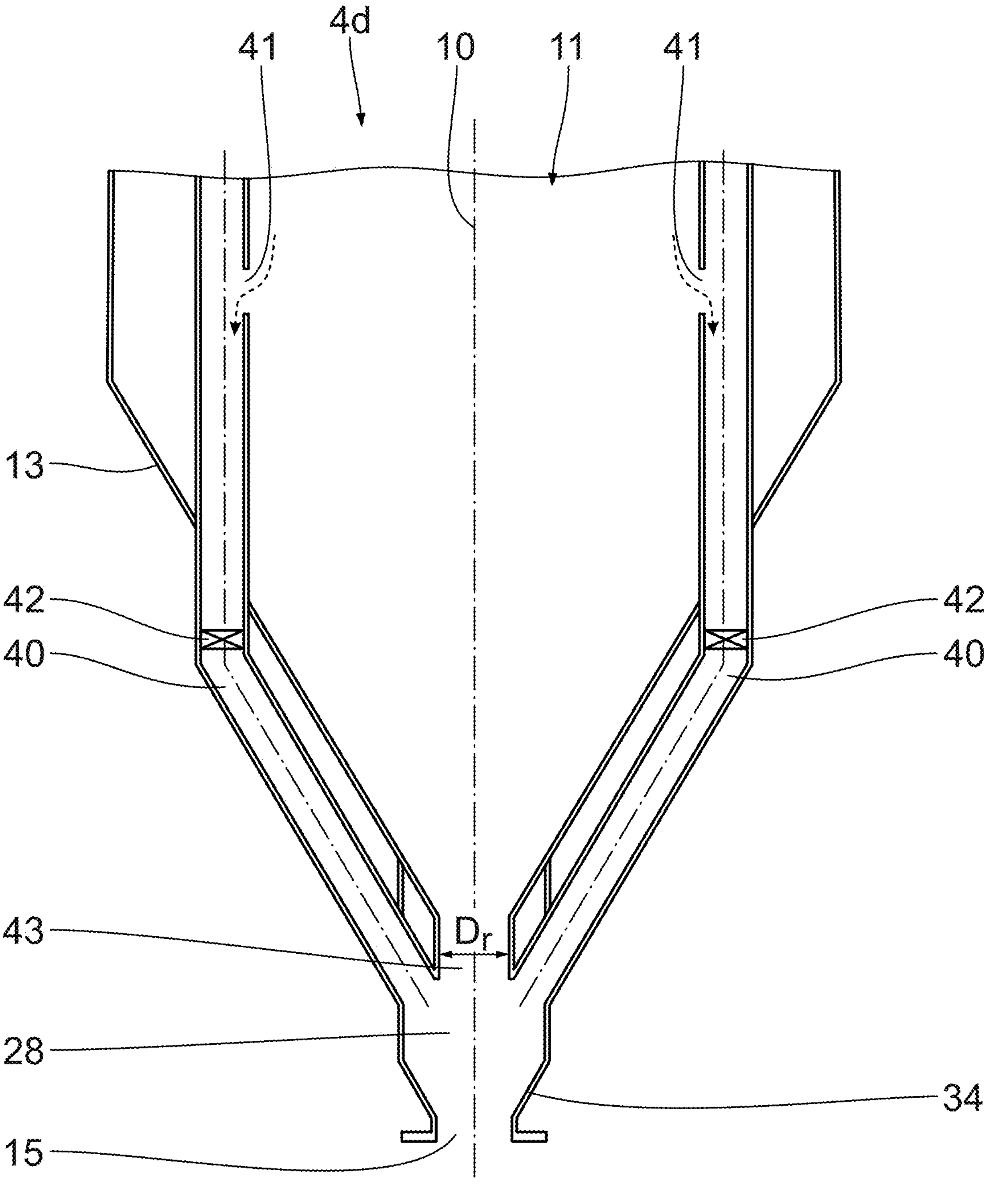
FIG. 10 shows an illustration corresponding to FIG. 9 of a tube mixer according to a further embodiment, in which shut-off elements are arranged on the mixing tubes upstream of the collecting pot.

In the following, a further embodiment of the invention is described with reference to FIG. 10. Constructively identical parts are given the same reference numerals as in the previous embodiments, the description of which is hereby referred to. Constructively different but functionally similar parts are given the same reference numerals with a trailing letter d.

The mixing silo 4*d* is a tube mixer. The mixing tubes 40 run partly inside and partly outside the silo container 11.

One difference compared to the previous embodiment is that shut-off elements 42 are each arranged inside the mixing tube 40. The shut-off elements 42 are each arranged upstream of the collecting pot 28. Such an arrangement of the shut-off elements 42 is advantageous in the embodiment shown, since the cone outlet 43 of the bottom section 13 also opens into the collecting pot 28. This ensures that when the mixing tubes 40 are shut off, the mixing operation is switched off and a uniform discharge in the mass flow from the mixing silo 4*d* is maintained, since the cone outlet 43 is free, i.e. not shut off.

For the design of the mixing silo **4*d*, in particular for the size of the outlet diameter $D_r$, the rearranged Beverloo equation (1) can be used. The data for the mixing silo 4*d*** are according to the example shown:

$$\dot{M}=80\ \text{t/h},\ C=0.58,\ \eta=550\ \text{kg/m}^3,\ k=1.6,\ d=3.5\ \text{mm}.$$

Accordingly, there is a minimum size for the outlet diameter of 0.224 m, so that the mass flow in flow-through operation is greater than or equal to the minimum extraction rate.

Figure 11:
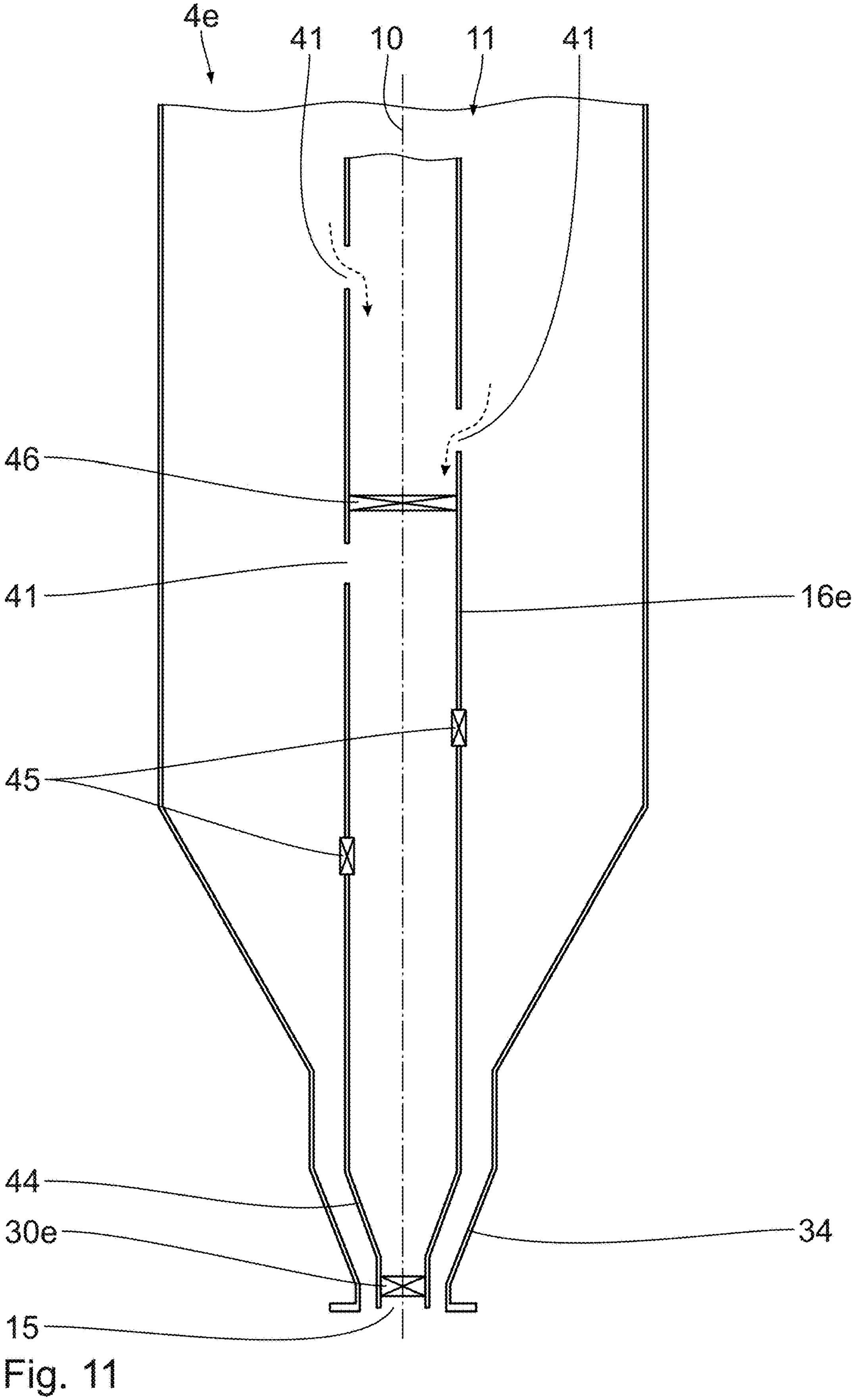
FIG. 11 shows an illustration corresponding to FIG. 9 of a tube mixer having a central mixing tube and a plurality of shut-off elements.

In the following, a further embodiment of the invention is described with reference to FIG. 11. Constructively identical parts are given the same reference numerals as in the previous embodiments, the description of which is hereby referred to. Constructively different but functionally similar parts are given the same reference numerals with a trailing letter e.

The mixing silo **4*e* is designed as a tube mixer having a central mixing tube 16*e***.

The shut-off element **30*e* is arranged at the lower end of the mixing tube 16*e*. At the lower end, the mixing tube 16*e* has a cone-shaped end piece 44. In particular, the shut-off element 30*e* is arranged at the end of the conical end piece 44. The central mixing tube 16*e* protrudes into the conically tapered outlet region 34 of the mixing silo 4*e*. In particular, the shut-off element 30*e* is arranged at the lower outlet opening 15 of the mixing silo 4*e***.

A plurality of openings 41 are arranged at the mixing tube **16*e*, in particular at different positions in the axial direction and in the circumferential direction with respect to the longitudinal axis 10. It is optionally possible to close at least one of the openings 41 with an additional shut-off element 45 in order to prevent bulk material from entering the mixing tube 16 from the silo container 11. It is also conceivable to provide all openings 41 with shut-off elements 45. In this case, it is conceivable to dispense with the lower shut-off element 30*e***.

According to the embodiment example shown, a further shut-off element 46 is provided in the mixing tube **16*e*, which shut-off element 46 is arranged upstream with respect to the shut-off element 30*e*. The shut-off element 46 serves in particular to prevent a bulk material flow in the mixing tube 16*e* through the openings 41 arranged above the shut-off element 46. In particular, the shut-off elements 45, 46 enable the mixing behaviour of the mixing silo 4*e*** to be influenced during the mixing operation.

In the following, a further embodiment of the invention is described with reference to FIG. 12. Constructively identical parts are given the same reference numerals as in the previous embodiments, the description of which is hereby referred to. Parts that are structurally different but functionally the same are given the same reference numerals with a trailing letter f.

The mixing silo **4*f* is designed as a tube mixer with a central mixing tube 16*f*. The mixing tube 16*f* has an overall height, i.e. a longitudinal extension along the longitudinal axis 10, which essentially corresponds to the overall height of the mixing cone of the cone mixer according to FIG. 2. In particular, the overall height of the mixing tube 16*f*** is between 80% and 120% of the overall height of the mixing cone, in particular between 90% and 110%.

At least one opening 41, in particular a plurality of openings 41, is provided on the mixing tube **16*f*, which form the inlet of the mixing tube 16*f*. The openings 41 are arranged at an end of the mixing tube 16*f* opposite the lower outlet opening 15. The openings 41 are arranged in the jacket wall of the mixing tube 16*f*. Additionally or alternatively, at least one opening can be provided at the face side of the upper end of the mixing tube 16*f***.

In particular, the mixing tube **16*f* is closed at its upper end 47 opposite the lower discharge opening 15. A bonnet 48, which is displaceable relative to the mixing tube 16*f*, serves as a shut-off element. The bonnet 48 has a cylindrical ring section 49, the inner diameter of which is at least as large as the outer diameter of the mixing tube 16*f*. In the arrangement shown in FIG. 12, the ring section 49 is in overlap with the openings 41, which means that bulk material from the silo container 11 is prevented from flowing into the mixing tube 16*f*. In the arrangement shown, the mixing tube 16*f* is in the shut-off state due to the shut-off element 48**.

The bonnet 48 can be displaced along the longitudinal axis 10 by means of a lifting drive 50. The lifting drive 50 is in particular a linear lifting drive, in particular a pneumatic drive. By actuating the lifting drive, the bonnet 48 is displaced in a direction 52 away from the mixing tube **16*f*, i.e. in a direction away from the lower discharge opening 15. This releases the openings 41 from the ring section 49 so that a bulk material flow via the openings 41 into the mixing tube 16*f*** is possible.

The bonnet 48 has an upper conical section 51. This ensures that the bulk material in the silo container 11 can flow along the bonnet 48 without jamming. In particular, the bonnet 48 is made in one piece. The linear actuating element 50 engages in particular with the conical section 51 of the bonnet 48.

Alternatively, it is also possible to provide openings in the cylinder section 49 that substantially correspond to the openings 41 in the mixing tube **16*f*. A displacement of the bonnet 48 between the open and the shut-off arrangement is then possible by rotating the bonnet 48 about the longitudinal axis 10. When the openings of the bonnet 48 and the openings 41 of the mixing tube 16*f* are at least partially aligned, a bulk material flow into the mixing tube 16*f* is possible. In this case, the use of the lifting drive 50 is not necessary. The lifting drive can be replaced accordingly by a rotary drive, which enables rotation of the bonnet 48 relative to the mixing tube 16*f***.

Figure 12:
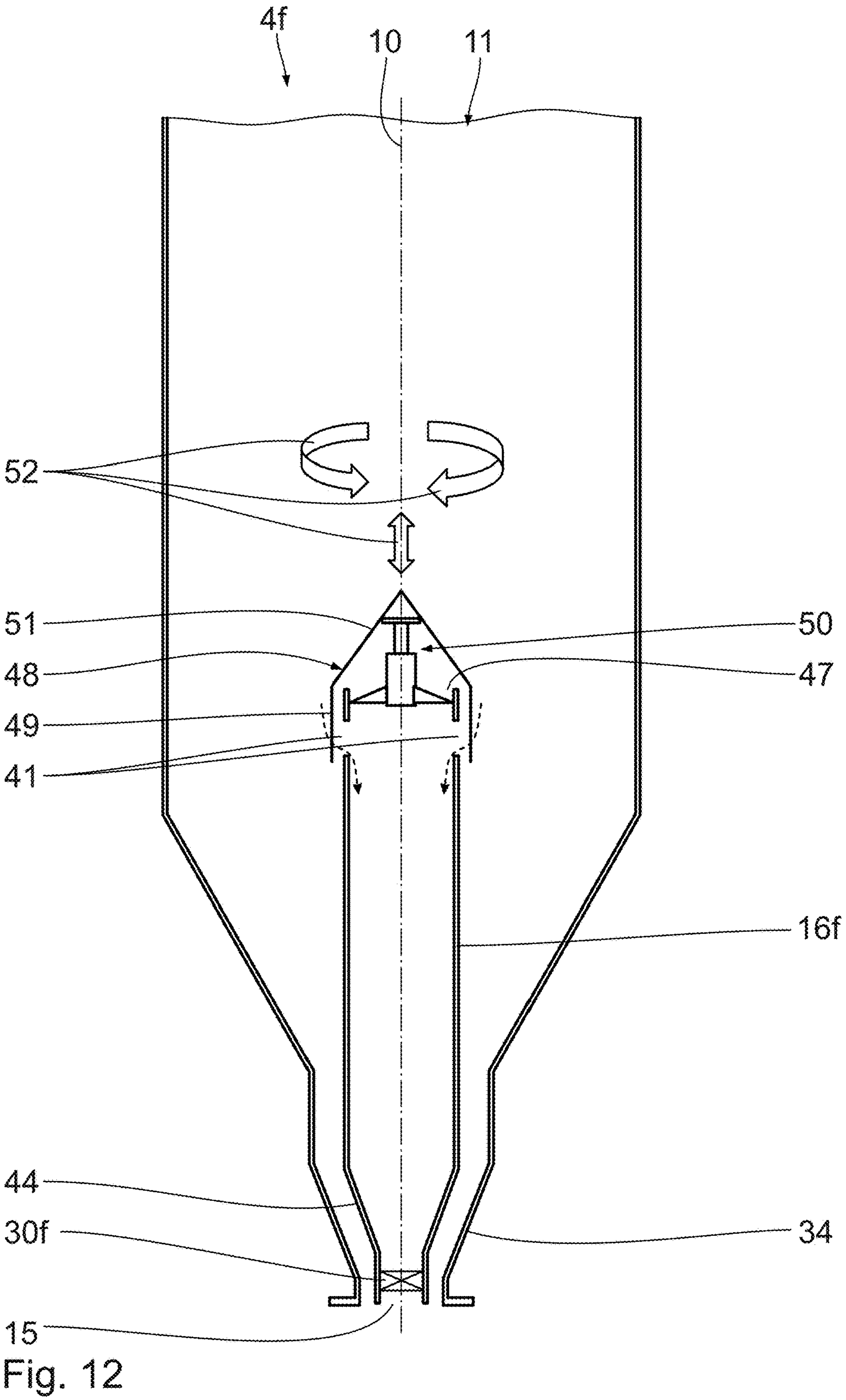
FIG. 12 shows an illustration corresponding to FIG. 11 of a tube mixer having a central mixing tube, wherein the shut-off elements are arranged at the inlet of the mixing tube.

The lifting movement and/or possible rotary movements of the bonnet 48 are shown schematically by movement arrows 52 in FIG. 12.

Alternatively, it is also possible to close the upper end 47 of the mixing tube **16*f* by means of a static installation, for example a conical bonnet. Shut-off elements 45 can then be arranged at the openings 41**, as explained with reference to the previous embodiment.

According to the embodiment shown, in addition to the shut-off element 48 at the inlet of the mixing tube **16*f*, the shut-off element 30*f* is arranged at the lower end of the mixing tube 16*f*, i.e. at the outlet. This shut-off element 30*f* can also be omitted, in particular if the inlet can be shut off by means of at least one shut-off element 45, 48**.

The main advantage of the arrangement of the shut-off elements 45, 48 at the inlet of the mixing tube **16*f* is that stagnating product in the mixing tube 16*f* can be avoided. This minimizes the risk and in particular prevents stagnating bulk material from getting stuck in the mixing tube 16*f*** and not being able to be released again, or only incurring great effort.

The invention claimed is:

1. A mixing silo for bulk material comprising a silo container, a mixing installation mounted in the silo container for mixing the bulk material, at least one shut-off element for shutting off the mixing installation, wherein the at least one shut-off element is movable between a closed position, in which a bulk material flow through the mixing installation is prevented and the mixing silo has a flow-through function, and an open position, in which a bulk material flow through the mixing installation is possible and the mixing silo has a mixing function, wherein the at least one shut-off element is arranged at least one of at and in the mixing installation, wherein the at least one shut-off element is arranged at the outlet of the mixing installation, wherein the mixing silo has a minimum extraction rate of at least 20 t/h for plastic bulk material comprising at least one of powder with an average particle size of between 50 μm and 2000 μm and granulate with an average particle size of 1500 μm to 6000 μm, wherein the silo container, with the mixing installation shut off, has a residual cross-sectional area that is limiting to the silo container in such a manner that a mass flow of the bulk material ensures the flow-through function and is greater than or equal to the minimum extraction rate of the mixing silo, wherein the limiting residual cross-sectional area represents a minimum cross-sectional area of the silo container along the flow direction of the bulk material, wherein even when the mixing function of the mixing silo is deactivated due to the mixing installation being shut off by means of the shut-off element, the mass flow through the mixing silo is maintained.

2. The mixing silo according to claim 1, wherein the silo container has a base container and a bottom section.

3. The mixing silo according to claim 2, wherein the base container is designed so as to be cylindrical.

4. The mixing silo according to claim 2, wherein the bottom section is conical.

5. The mixing silo according to claim 1, further comprising a shut-off drive connected to the at least one shut-off element for driven actuation of the at least one shut-off element.

6. The mixing silo according to claim 5, further comprising a control unit in signal connection with the shut-off drive for automated actuation of the at least one shut-off element.

7. The mixing silo according to claim 1, wherein the at least one shut-off element is designed as a flap disc.

8. A production plant having a production reactor for producing bulk material, a mixing silo according to claim 1, and a feed unit for feeding bulk material.

9. The production plant according to claim 8, wherein said production plant has the feed unit for feeding bulk material from the production reactor into the mixing silo.

10. The production plant according to claim 8, further comprising a recirculation unit connecting the discharge unit to the feed unit for recirculation of the bulk material.

11. A method for operating a mixing silo according to claim 1, comprising the steps of feeding bulk material into the mixing silo, mixing of the bulk material in the mixing silo by means of the mixing installation, shutting off the mixing installation by means of the at least one shut-off element, wherein the at least one shut-off element is movable between a closed position, in which a bulk material flow through the mixing installation is prevented and the mixing silo has a flow-through function, and an open position, in which a bulk material flow through the mixing installation is possible and the mixing silo has a mixing function, wherein the at least one shut-off element is arranged at least one of at and in the mixing installation, wherein the at least one shut-off element is arranged at the outlet of the mixing installation, discharging the bulk material from the mixing silo with the mixing installation shut off by means of the shut-off element, over the limiting residual cross-sectional area and the outlet cross-sectional area at the outlet of the silo container in such a manner that a mass flow of the bulk material ensures the flow-through function and one of is greater than and equal to the minimum extraction rate of at least 20 t/h for plastic bulk material comprising at least one of powder having an average particle size between 50 μm and 2000 μm and/or granulate having an average particle size of 1500 μm to 6000 μm of the mixing silo, wherein even when the mixing function of the mixing silo is deactivated due to the mixing installation being shut off by means of the shut-off element, the mass flow through the mixing silo is maintained.

12. The method according to claim 11, wherein the shut-off takes place when a change of at least one of a bulk material type and a bulk material quality class is pending at the beginning of the change.

13. The method according to claim 11, wherein all shut-off elements are used for shutting off the mixing installation.

14. The method according to claim 11, wherein the shut-off takes place when a change of at least one of a bulk material type and a bulk material quality class is pending.

15. The method according to claim 11, wherein a plurality of shut-off elements are used for shutting off the mixing installation.

16. The method according to claim 11, wherein the at least one shut-off element is opened again after a variably adjustable changeover time (t) has elapsed.

17. The method according to claim 11, wherein the maximum dwell time of the bulk material in the mixing silo with the mixing installation shut off is 1.0 times to 1.4 times a maximum dwell time of an otherwise identical silo container without mixing installation.

18. A mixing silo for bulk material comprising a mixing silo for bulk material comprising a silo container, a mixing installation mounted in the silo container for mixing the bulk material, at least one shut-off element for shutting off the mixing installation, wherein the at least one shut-off element is movable between a closed position, in which a bulk material flow through the mixing installation is prevented and the mixing silo has a flow-through function, and an open position, in which a bulk material flow through the mixing installation is possible and the mixing silo has a mixing function, wherein the at least one shut-off element is arranged at least one of at and in the mixing installation, wherein the at least one shut-off element is arranged at the outlet of the mixing installation, wherein the mixing silo has a minimum extraction rate of at least 20 t/h for plastic bulk material comprising at least one of powder with an average particle size of between 50 μm and 2000 μm and granulate with an average particle size of 1500 μm to 6000 μm, wherein the silo container, with the mixing installation shut off, has a residual cross-sectional area that is limiting to the silo container in such a manner that a mass flow of the bulk material ensures the flow-through function and is greater than or equal to the minimum extraction rate of the mixing silo, wherein the limiting residual cross-sectional area represents a minimum cross-sectional area of the silo container along the flow direction of the bulk material, wherein the mixing installation comprises a plurality of mixing tubes having one or more openings, which are located at different heights in the mixing silo.

19. The mixing silo according to claim 18, wherein the plurality of mixing tubes opens into a collecting pot.

20. The mixing silo according to claim 18, wherein the at least one shut-off element is arranged at least one of at and in a collecting pot.

* * * * *